July 12, 1960

B. N. ASHTON 2,944,400

SELF-CONTAINED POWER ACTUATOR

Original Filed Aug. 1, 1951

INVENTOR.
BENJAMIN N. ASHTON
BY
ATTORNEYS

July 12, 1960 B. N. ASHTON 2,944,400
SELF-CONTAINED POWER ACTUATOR
Original Filed Aug. 1, 1951 4 Sheets-Sheet 3
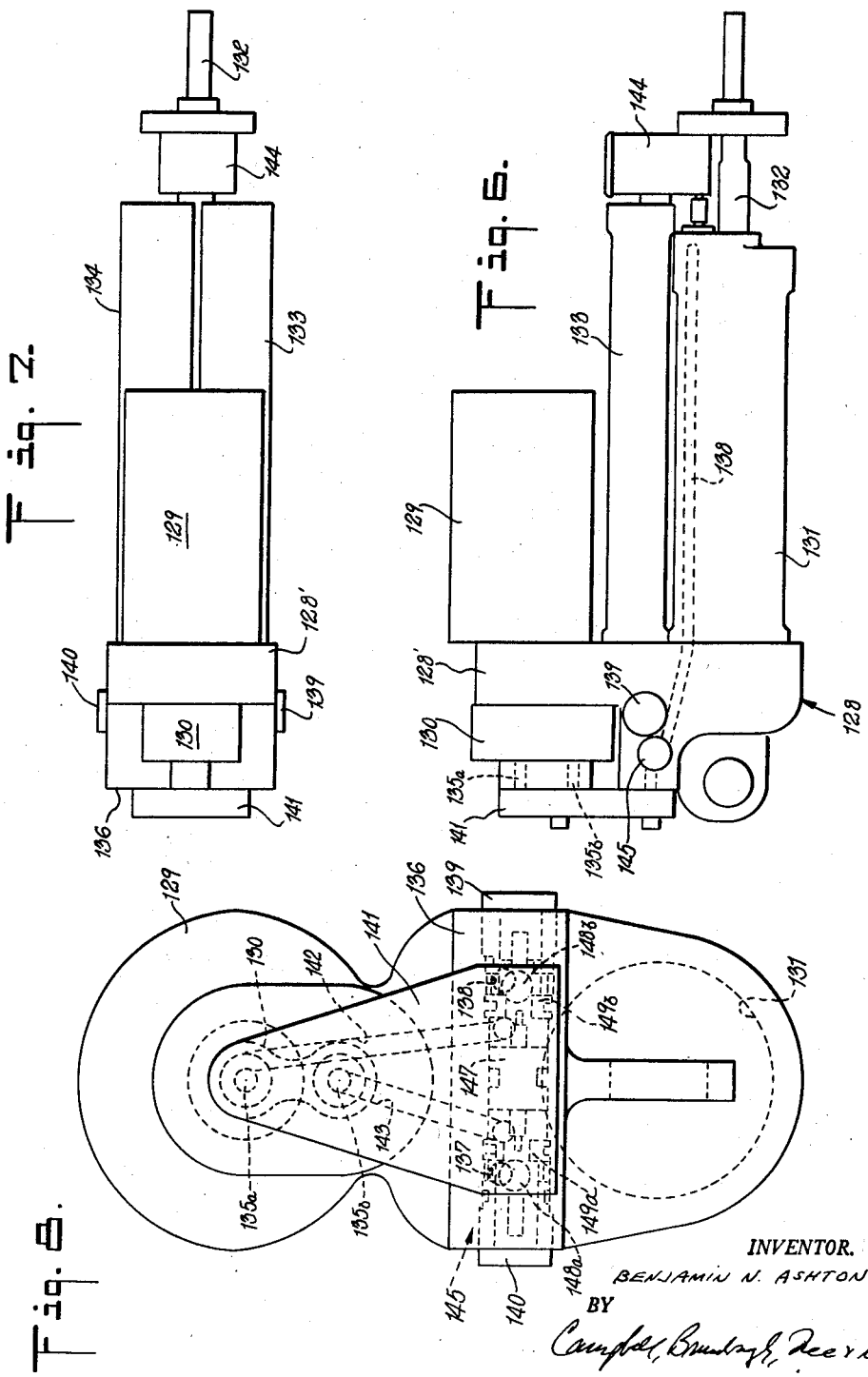
INVENTOR.
BENJAMIN N. ASHTON
BY
ATTORNEYS

INVENTOR.
BENJAMIN N. ASHTON

United States Patent Office 2,944,400
Patented July 12, 1960

2,944,400

SELF-CONTAINED POWER ACTUATOR

Benjamin N. Ashton, Kingston, N.Y., assignor to Electrol Incorporated, Kingston, N.Y., a corporation of Delaware Original application Aug. 1, 1951, Ser. No. 239,800, now Patent No. 2,746,251, dated May 22, 1956. Divided and this application Mar. 8, 1956, Ser. No. 570,319

1 Claim. (Cl. 60—52)

This invention relates to hydraulic actuators and more particularly to self-contained actuator assemblies adapted to be operated by means of simplified external control circuits.

This application is a division of the copending application Ser. No. 239,800, filed August 1, 1951, now U.S. Patent No. 2,746,251, dated May 22, 1956.

Hydraulic actuators are well known for their low cost, high efficiency, rapid response characteristics and light weight, and for this reason are widely used wherever power actuators are needed. One limiting factor, however, in the use of hydraulic actuators as opposed to other types of power actuators, such as electro-mechanical devices, is the control system. The control of hydraulic actuators is commonly effected by means of a valve assembly and pressure source located externally and remotely of the power converting unit itself. Hydraulic systems for use in aircraft, for example, may utilize a central valve control system for governing the flow of fluid to several actuators located throughout the plane. This necessitates the close maintenance of the various fluid conduits and presupposes the continuing operability of the central system and, in many cases, of each of the remote actuators.

It has been found, however, that improved operating characteristics including safety, reliability and efficiency may be achieved by eliminating the central pressure source and control valve assembly, as well as the numerous pressure and discharge conduits which must necessarily radiate therefrom.

It is accordingly one object of this invention to provide an hydraulic actuator unit embodying within one compact housing all of the basic components of an hydraulic system.

It is another object of the invention to provide an efficient hydraulic unit adapted to be externally controlled by means of simplified electrical control circuits.

In accordance with the invention an hydraulic unit may be provided which comprises a single housing having an hydraulic cylinder, an electric motor, and a pump mounted therein as a compact assembly to be controlled externally by means of an electric control circuit to the motor. The cylinder may be fitted with limit switches whereby the system is automatically shut off at the completion of each stroke of a piston within the cylinder, and reversing of the piston within the cylinder may be accomplished effectively by reversing the motor and pump.

The above and other features and objects of the invention may be better understood with reference to the accompanying drawings in which:

Fig. 6 is a view in elevation of an hydraulic power actuator, generally similar to that shown in Figs. 3–5, but comprising a modified mechanical arrangement;

Fig. 7 is a top view of the apparatus shown in Fig. 6;

Fig. 8 is a left end view of the apparatus shown in Figs. 6 and 7;

Figure 1:
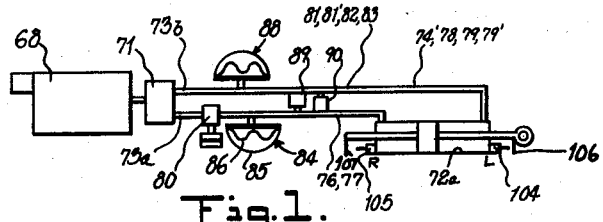
Fig. 1 is a schematic diagram of an hydraulic system formed in accordance with the present invention.

Referring first to Figs. 1 and 3–5, the invention is illustrated or embodied in a self-contained hydraulic power actuator which comprises a frame 67 having an upstanding wall portion 67' to one side of which a reversible electric motor 68 is attached by means of bolts 69. The motor 68 is coupled by a drive shaft 70 to an hydraulic pump 71, bolted to the wall 67' on the opposite side from the motor. The pump 71 is reversible and may be a conventional gear pump, for example, having first and second output-input connectors 73a and 73b, respectively.

Formed in the frame 67 beneath the pump and motor is an hydraulic jack assembly 72 including a cylinder 72a having a piston 72b slidably mounted therein for reciprocatory movement. The left hand end of the cylinder 72a (Fig. 4) is closed by a cap 74 having a duct 74' formed therein, and the right hand end is closed by the lower end 75' of a passage plate 75, which is carried by the frame 67.

The connector 73a of the pump 71 is joined to the right hand end of the cylinder 72a through ducts 76 and 77, which are formed in the passage plate 75. The left hand end of the cylinder communicates with the second inlet-outlet connector 73b of the pump 71 by means of a flow path including the ducts 74', 78, 79 and 79' (the latter two being formed in the passage plate), a normally closed solenoid-actuated shut-off valve 80, ducts 81, 81', a chamber 82 and a duct 83.

Joined to the connector 73a of the pump 71, and connected to the conduit leading to the right hand end of the cylinder 72a is an accumulator 84 (Figs. 1 and 3) comprising a shell 85 which houses a resilient diaphragm 86 which receives fluid under pressure. A second accumulator 88 is connected to the conduit circuit leading to the left hand end of the cylinder, and is similar to that described above. The accumulators store energy, reduce peak pressures and store fluid, all according to well-known principles.

Figure 4:
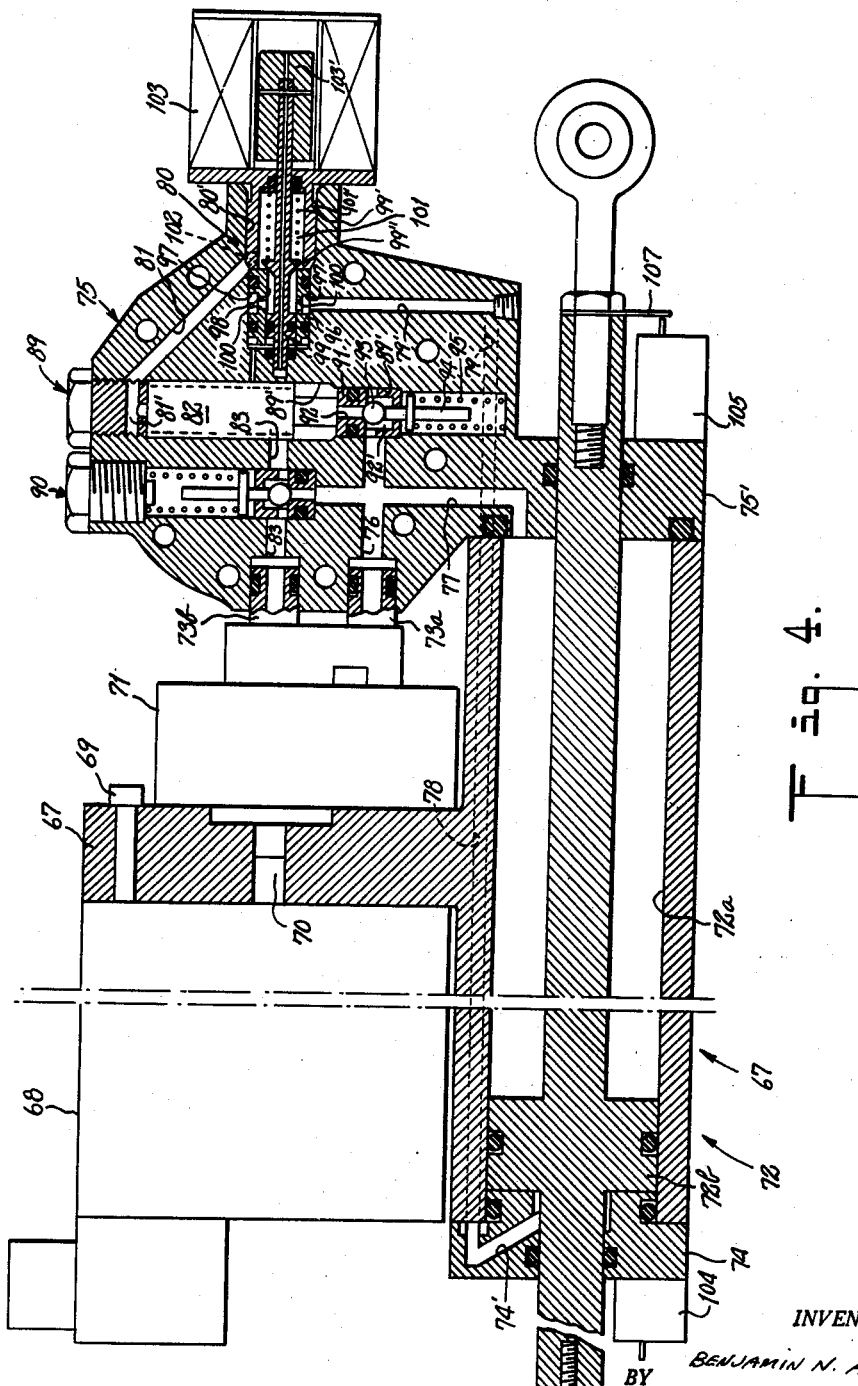
Fig. 4 is a view in side elevation partially in section of the apparatus shown in Fig. 3, taken on the line 4—4 of Fig. 3 looking in the direction of the arrows.

Cross connected in shunt across the ducts 74 and 83 from the pump connectors 73a and 73b are a pair of pressure relief valves 89 and 90. The valves are substantially identical and only one need be described in detain herein. The valve 89, as best seen in Fig. 4, is received in the lower end of an enlarged bore 89' formed in the passage plate 78, and comprises a valve seat 91 formed with a duct 92 which communicates with the duct 83 and a chamber 92' which communicates with the duct 76. A ball valve 93 is urged against the seat by a plunger 94 biased by a compression spring 95. As the pressure in the duct 92 exceeds the seating pressure of the ball, as when the hydraulic jack becomes overloaded, the ball 93 will unseat and afford a shunt path for the fluid between the connectors 73a and 73b of the pump 71. The pressure relief valve 90 operates the same way to relieve pressure in a shunt path from the connector 73a to the connector 73b.

The solenoid control valve assembly 80, as best seen in

Fig. 4, is received in a horizontal bore 80' formed in a passage plate 75 and includes a sleeve 96 formed with a circumferential duct 97 which communicates with the vertical duct 79'. The sleeve is formed with a central bore 98 which receives a balanced poppet valve 99, and radial ducts or ports connect the bore 98 with the duct 97. A chamber 101 is formed in a sleeve 101' disposed to the right of the bore 98 and is in communication therewith. A duct 102 connects the chamber 101 to the pump connector 73b through ducts 81, 81', 82 and 83, all as described above. Operation of the valve is controlled by a solenoid coil 103, connected in an electrical control circuit described more fully below, which acts to draw a solenoid core 103' carried on the outer end of the stem of the valve 99 to the right to cause the valve 99 to connect the bore 98 with the chamber 101. A compression spring 99' urges the valve 99 toward its normally closed position to the left, the spring acting against a valve poppet head 99'' formed on the valve stem. The travel of the valve to the right is sufficient to unseat the valve, but is not sufficient to close the ports 100.

In order to control the stroke of the piston 72b so that the pressure may be shut off at the completion of each stroke, a pair of dual limit switches 104 and 105 are mounted at the left and right hand ends, respectively, of the jack assembly 72. The limit switches 104 and 105 are operated by means of arms 106 and 107, respectively, carried on opposite ends of the piston rod.

Figure 2:
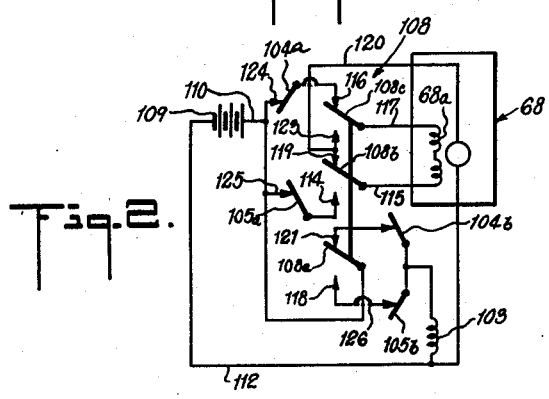
Fig. 2 is a wiring diagram of a control circuit for the system shown in the schematic diagram of Fig. 1.
Figure 3:
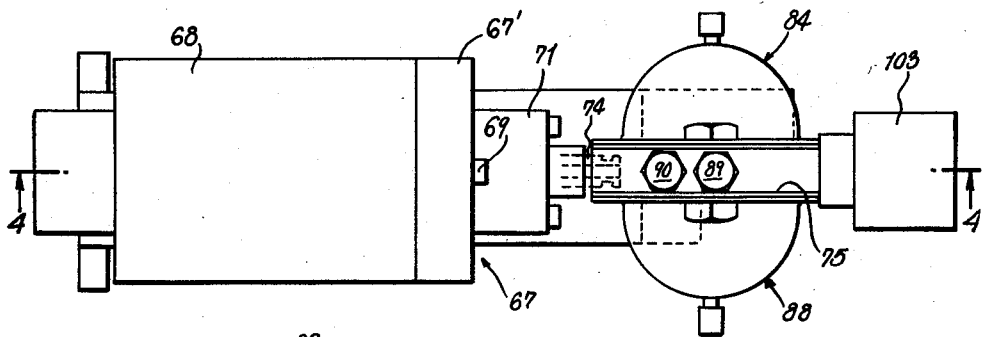
Fig. 3 is a top view of a self-contained hydraulic power actuator assembly embodying the system and circuit shown in Figs. 1 and 2, respectively.
Figure 5:
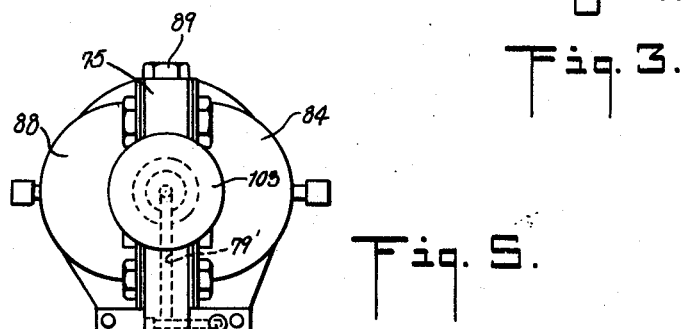
Fig. 5 is a right end view of the apparatus of Figs. 3 and 4.

Referring now to Fig. 2, it will be seen that the electrical circuit for controlling and operating the hydraulic actuator device described above includes the reversible electrical motor 68 which drives the pump, the solenoid coil 103 for actuating the shut-off valve 80, the dual limit switches 104, 105 which include switches 104a, 105a and 104b, 105b, a triple-throw, double-pole control switch 108 and a suitable source of electrical energy such as a battery 109, for example. The positive terminal of the battery is connected by a conductor 110 to stationary contacts 124 and 125 of the limit switches 104a and 105a, respectively, and to one pole 108a of the switch 108. The negative terminal of the battery 109 is connected by means of a conductor 112 to the solenoid coil 103 and the armature of the motor 68, and the limit switches 104a and 105a are connected to stationary contacts 116 and 114, respectively, of the switch 108.

The contact 114 may be connected to one terminal of the field winding 68a of the motor 68 by means of a pole 108b of the switch 108 and a conductor 115, and the contact 116 is connected to the other terminal of the field winding 68a by means of a pole 108c of the switch 108 and a conductor 117. The switch poles 108b and 108c may also engage stationary contacts 119 and 123, respectively, both of which are connected by a conductor 120 to the armature of the motor 68. The pole 108a, which is connected to the positive terminal of the battery, may be connected alternately to the solenoid coil 103 through contacts 121 or 118 of the switch 108 through either of the limit switches 105b, 104b.

In operation, a desired direction of movement of the piston 72b is selected by means of the switch 108. Moving the switch 108 to one position causes the motor 68 to rotate in one direction and moving the switch 108 to the other position reverses the motor. With the switch 108 actuated, as shown in Fig. 2, so that the pole 108c engages the contact 116, the pole 108b engages the contact 119 and the pole 108a engages the contact 121, an electrical circuit is completed to the motor 68 from the battery 109 including the conductor 110, the closed limit switch 104a, the contact 116 and pole 108c of the switch 108 and the conductor 117 to the field winding 68a. The return circuit from field winding 68a to the battery includes the conductor 115, the pole 108b and contact 119 of the switch 108, the conductor 120 to the armature of the motor 68, the other terminal of which is connected to the negative side of the battery through the conductor 112. The coil 103 of the solenoid coil is also connected across the battery, one terminal being connected to the positive side of the battery through a circuit including the conductor 110, the pole 108a, the contact 121 and the closed limit switch 104b, and the other terminal being connected to the negative side of the battery by the conductor 112.

For purposes of description it will be assumed that the piston is disposed between its end points of travel. In this position the dual limit switches 104a, 105a and 104b, 105b will be in their normally closed positions. The piston will now move until such time as the switch 108 is opened or the limit switch 104a, 104b is actuated, as when the piston reaches the end of its stroke to the left. Actuation of the limit switches will break the circuit to the motor and coil, simultaneously, terminating the flow of hydraulic liquid. The hydraulic jack may be reversed then by reversing the switch 108 which establishes the connections so that the motor 68 is reversed. The pole 108c engages the contact 123, the pole 108b engages contact 114 and pole 108a engages contact 118 to connect the positive side of the battery through the conductor 115 to the opposite terminal of the motor armature and through the conductor 126 to the coil 103. The return circuit to the battery is completed from the motor to the battery by means of the conductor 112.

Figure 9:
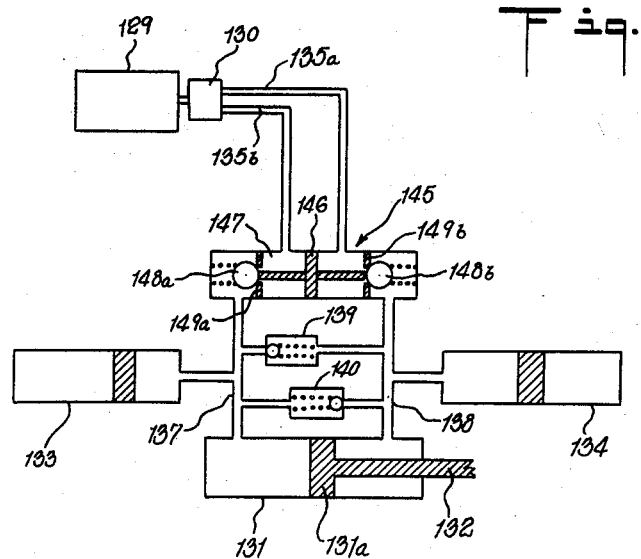
Fig. 9 is a schematic diagram of the power actuator in Figs. 6–8.
Figure 10:
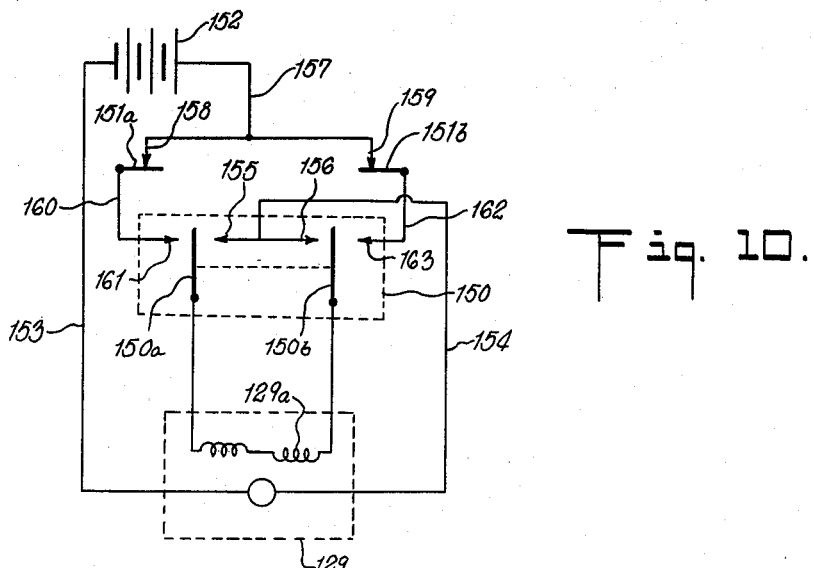
Fig. 10 is a wiring diagram of the power actuator shown in Figs. 6–8.

Referring to Figs. 6–8 and also to Figs. 9 and 10 there is shown a modified version of the hydraulic actuator as shown in Figs. 1–5, and includes a frame portion 128 having an upright wall portion 128' to opposite sides of which are bolted a motor 129 and a reversible gear pump 130. The lower end of the frame 128 carries a cylinder 131 which receives a piston 131a (Fig. 9) and a piston rod 132 which projects from its right hand end as viewed in Figs. 6, 7 and 10. Mounted on the frame 128 between the motor 129 and the cylinder 131 are a pair of parallel, elongated accumulators 133 and 134 and a double, pressure actuated check valve 145, as best seen diagrammatically in Fig. 9.

The pump 130 has a pair of outlet-inlet connectors or ducts 135a and 135b which are arranged one above the other to terminate in a vertical plane which includes a left hand end surface 136 of the frame 128. The lower portion of the frame 128 is formed with a duct 137 which runs from the left hand end 136 of the frame, through the double check valve 145, to the left hand end of the cylinder 131. Also formed in the frame is a duct 138 which runs from the right hand end of the cylinder 131 to the left hand end 136 of the frame through the double check valve 145. Cross connected in inverted relationship between the ducts 137 and 138 within the frame are a pair of pressure relief valves 139 and 140 which afford a shunt, pressure-relief path for the fluid in the event the pressure in either duct exceeds a predetermined value.

Bolted to the left hand end 136 of the frame 128 and to the ducts 135a and 135b of the pump 130 is a passage-plate 141 which is formed with a first duct or passageway 142 which joins the output-input connector 135a with the double pressure actuated check valve 145 which communicates with the right hand end of the cylinder 131 through the duct 138, as stated. Also formed in the passage-plate 141 is a second duct 143, which when the plate is assembled, joins the second output-input connector 135b with the double pressure actuated check valve 145 which communicates with the left hand end of the cylinder through the duct 137, as stated. The check valve 145, as best seen in Figs. 8 and 9, includes a centered or dividing piston 146 operating in a cylinder 147 which houses a pair of ball checks 148a and 148b spring biased against seats 149a and 149b, respectively. In operation, the check valve prevents any motion of the piston 131a due to external loads unless the pump is producing flow and pressure to move the central piston 146 to open one of the ball checks 148a or 148b.

Passages (not shown) are also formed within the frame 128 connecting the accumulators 133 and 134 to the ducts 137, 138, respectively, so that the accumulators might store fluid under pressure between strokes of the piston and relieve pressure, all according to well-known principles. Preferably the accumulators are connected to the passages 137 and 138 at points between the pump and the cross connected pressure relief valves.

A limit switch housing 144 is mounted adjacent the right hand end of the cylinder to be actuated as the cylinder reaches either end of the stroke in a manner broadly similar to that described above with reference to Figs. 1–5.

The electrical diagram for the system shown in Figs. 6–9 is shown in Fig. 10 and includes a double-pole double-throw switch 150, a pair of normally closed limit switches 151a, 151b which operate to connect the motor 129 to a source of electrical energy such as the battery 152, for example. To this end, poles 150a and 150b of the switch 150 are connected to opposite terminals of the field winding 129a of the motor 129. One terminal of the motor armature is connected to the negative side of the battery 152 by means of a conductor 153 and the other terminal of the armature is connected by means of a conductor 154 to each of a pair of stationary contacts 155 and 156 in the switch 150. The positive terminal of the battery 152 is connected by means of a conductor 157 to each of the contacts 158 and 159 of the limit switches 151a and 151b, respectively. The limit switch 151a is connected by a conductor 160 to a stationary contact 161 of the switch 150, and the limit switch 151b is connected by a conductor 162 to a stationary contact 163 of the switch 150. The switch 150 may be actuated in one direction so that the poles 150a and 150b engage contacts 161 and 156, respectively, to complete a circuit through the motor armature and field winding. This will drive the motor until such time as one of the limit switches is opened whereupon reversal of the switch 150 will drive the motor in the reverse direction, the open limit switches at this time being permitted to close.

Thus it will be seen that a highly simplified and effective assembly design may be provided according to the invention for combining a pump, a motor, accumulators and an hydraulic jack into an integrated unit susceptible of remote control solely through electrical wiring. Although several preferred embodiments of the invention have been described above with reference to the drawings, it is to be understood that numerous modifications may be made in the design without departing from the scope of the invention, which should not, therefore, be limited except as set forth in the following claim.

I claim:

Hydraulic apparatus comprising a frame including a cylinder having open opposite ends, a wall extending laterally from said frame away from said cylinder, a pump carried by said wall, an electric motor carried by said wall, means extending through the wall connecting said motor to said pump for driving it, piston means in the cylinder, a passage plate secured to one end of said frame and having a first cap portion thereon closing one end of said cylinder, a second cap portion closing the other end of said cylinder, a piston rod fixed to said piston and extending through one of said cap portions, first conduit means including passages in the plate connecting the output of the pump with the cylinder on opposite sides of the piston means, a selector valve assembly in the plate for selectively directing the output of the pump to the cylinder on opposite sides of the piston means, and electromagnetic means carried by the passage plate to operate the selector valve assembly.

References Cited in the file of this patent

UNITED STATES PATENTS

| 1,269,338 | Tourreil | June 11, 1918 |
| 1,948,951 | Walker | Feb. 27, 1934 |
| 2,247,141 | Twyman | June 24, 1941 |
| 2,288,076 | Erling | June 30, 1942 |
| 2,410,978 | Kelly | Nov. 12, 1946 |
| 2,457,467 | Hartman | Dec. 28, 1948 |
| 2,559,125 | Lee | July 3, 1951 |
| 2,586,682 | McLeod | Feb. 19, 1952 |
| 2,640,426 | McLeod | June 2, 1953 |
| 2,640,465 | McLeod | June 2, 1953 |

FOREIGN PATENTS

| 463,568 | Great Britain | Apr. 2, 1937 |